No. 858,294. PATENTED JUNE 25, 1907.
W. KOESTER.
GRAIN SEPARATOR.
APPLICATION FILED AUG. 7, 1906.

4 SHEETS—SHEET 1.

William Koester, Inventor.

By David O. Barnell,

Attorney.

Witnesses:

No. 858,294. PATENTED JUNE 25, 1907.
W. KOESTER.
GRAIN SEPARATOR.
APPLICATION FILED AUG. 7, 1906.

4 SHEETS—SHEET 2.

William Koester, Inventor.

Witnesses:
J. M. Schramek
Wm L. Kreuzer

By David O. Barnell,
Attorney.

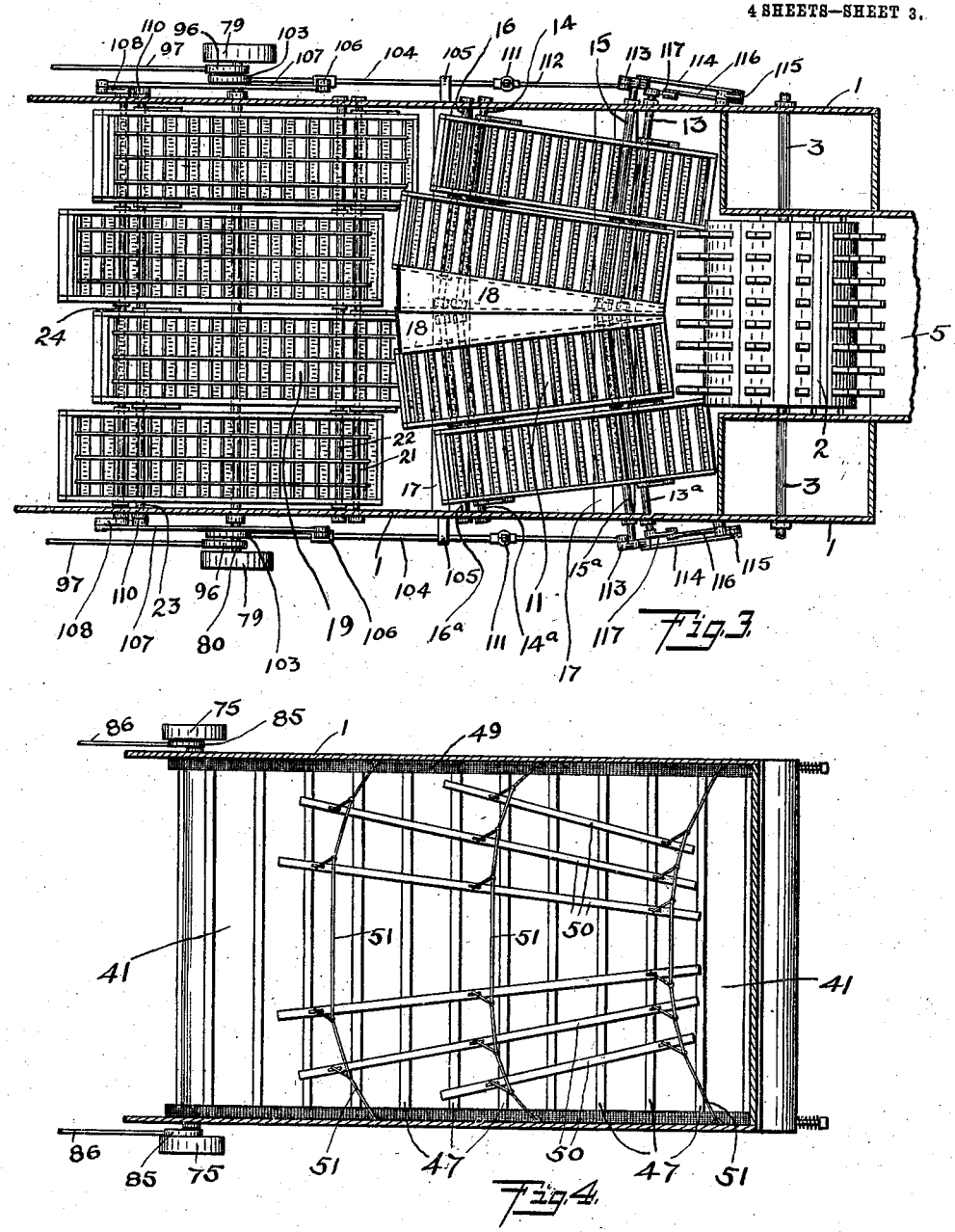

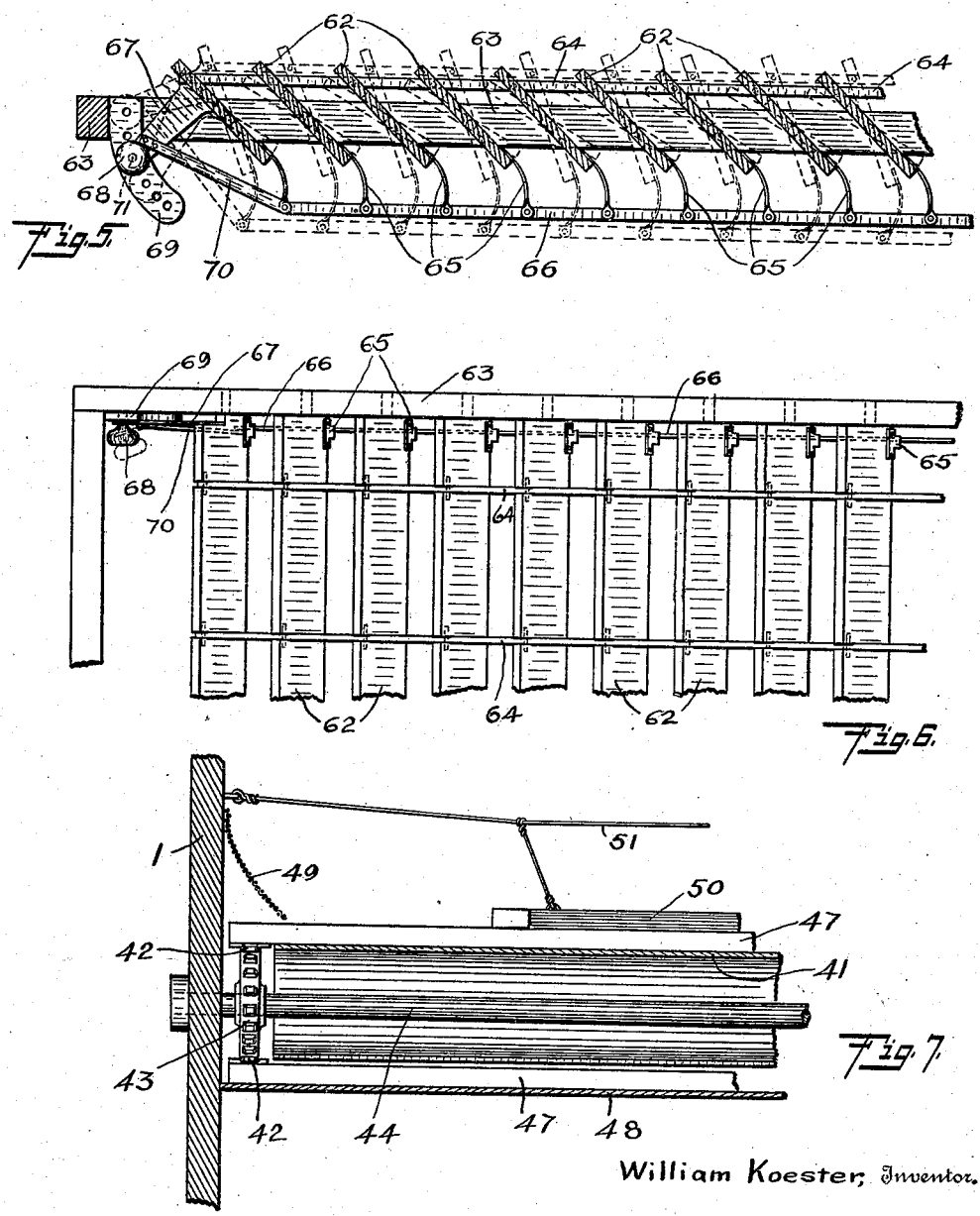

UNITED STATES PATENT OFFICE.

WILLIAM KOESTER, OF BOYD COUNTY, NEBRASKA.

GRAIN-SEPARATOR.

No. 858,294.   Specification of Letters Patent.   Patented June 25, 1907.

Application filed August 7, 1906. Serial No. 329,602.

*To all whom it may concern:*

Be it known that I, WILLIAM KOESTER, a citizen of the United States, residing in the county of Boyd and State of Nebraska, have invented certain new and useful Improvements in Grain-Separators, of which the following is a full, clear, and exact description, such as will enable others skilled in the art to make and use the same.

My invention relates to grain separators or threshing machines and it is the object thereof to provide means for more thoroughly cleaning the grain and for removing a greater proportion thereof from the straw than is done by the machines now in general use. These objects are attained by the use of adjustable straw racks in which the size of openings can be set to the amount best suited to the kind and condition of the grain being threshed, by the use throughout the machine of underhung racks pivotally mounted at both ends thereof and having an angular upward and rearward reciprocatory motion by which the straw is thoroughly agitated and rapidly moved through the machine, by the use of special distributing means by which the straw and grain are each uniformly distributed across the entire width of the racks and sieves so that the entire surfaces thereof are utilized, by the use of additional straw racks over the number ordinarily employed, and by providing an auxiliary cleaning fan or blower for giving a blast of air over and through the rearward straw racks and grain pans.

A further object of my invention is to so counterbalance the shaking racks with each other as to avoid undue vibration of the machine body.

Figure 1:
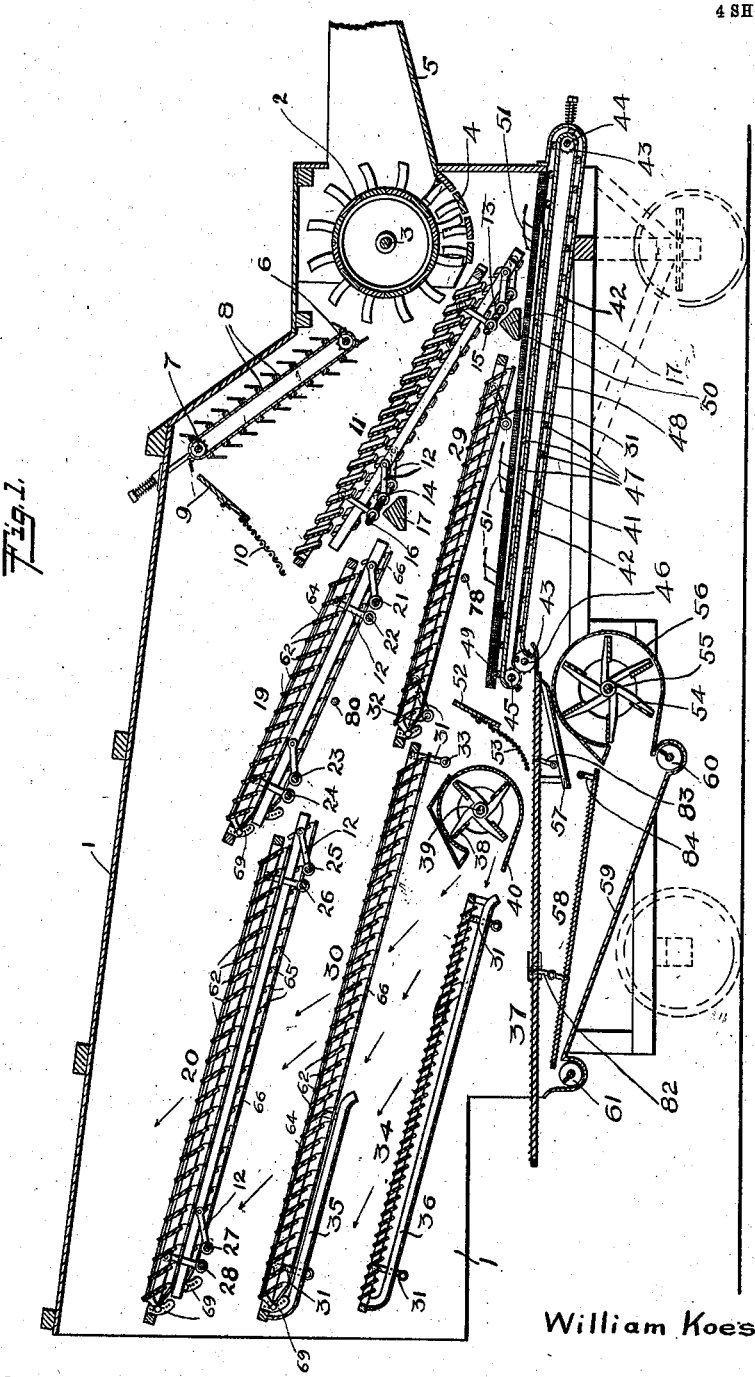
Figure 2:
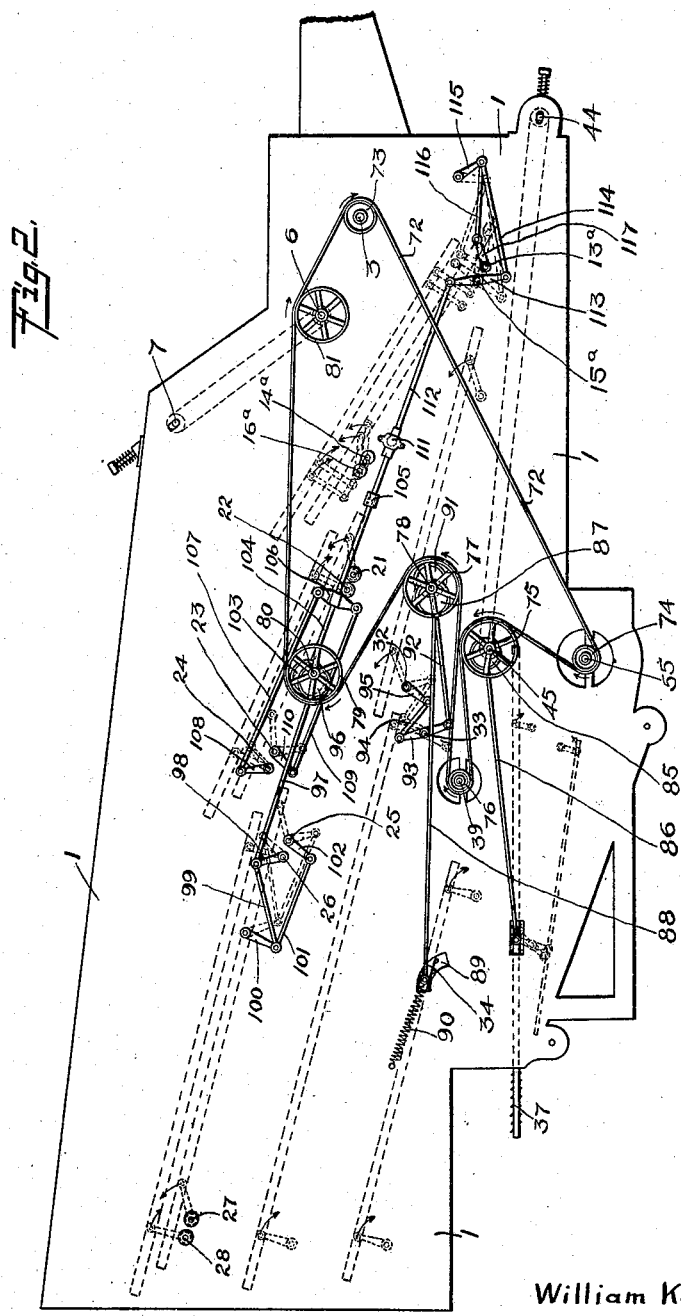

Constructions embodying my invention are illustrated in the accompanying drawings, in which Figure 1 is a longitudinal section through the separator body, Fig. 2 is a side elevation thereof, showing the principal driving mechanism, Fig. 3 is a partial sectional plan showing the arrangement of the divergent distributing straw racks, Fig. 4 is a similar view of the distributing grain table and conveyer, Fig. 5 is a detail longitudinal section of a portion of one of the adjustable straw racks, Fig. 6 is a plan view of the same, and Fig. 7 is a detail transverse section of a portion of the distributing grain pan and conveyer.

In the drawings 1 represents a casing or housing of suitable form and construction for inclosing the operating parts of the machine. Within the housing at the front end thereof is a toothed threshing cylinder 2 mounted on a shaft 3 and arranged to coöperate with toothed concaves 4, a feed table 5 being disposed in front of the cylinder and concaves in the usual manner. Adjacent the cylinder and extending rearwardly and upwardly therefrom is the over-rake comprising endless chains passing over sprockets carried on the shafts 6 and 7, said chains carrying between the same slats 8 having rearwardly pointing spikes therein, as shown. The over-rake is so driven that the spiked slats 8 are moved past the cylinder teeth in a direction opposite to the movement thereof, thereby preventing clogging of the cylinder teeth with straw. Near the rear and upper end of the over-rake is a check board 9 having a hinged lower portion to which is secured the depending canvas flap 10. The said board and flap serve to check the movement of the straw thrown upward from the cylinder and carried by the over-rake, and to direct said straw downward onto the shaking straw racks.

The distributing straw racks 11 extend upwardly and rearwardly from below the threshing cylinder and receive the straw and grain passing therefrom. The said racks are arranged in pairs at each side of the central axis of the machine, the racks of each pair lying parallel with each other and diverging from the said axis of the machine toward the sides of the housing 1, as shown in Fig. 3. The racks at one side of the machine are supported by the arms 12 extending upwardly from the shafts 13, 14, 15 and 16, the outer rack being connected with the shafts 13 and 14 and the inner rack being connected with the shafts 15 and 16. The said shafts are arranged parallel with each other and with the ends of the racks, the outer ends of the shafts being journaled in suitable bearings in the side of the housing 1, and the inner ends being journaled in bearings carried on the transversely extending beams 17 of which the upper surfaces are inclined, as shown, to prevent lodgment of grain thereon. The racks at the other side of the machine are supported by the arms 12 carried by the shafts 13ª, 14ª, 15ª and 16ª, said shafts being arranged with relation to the respective racks similarly to the shafts 13, 14, 15 and 16. The shafts 14 and 16, and 14ª and 16ª are actuated, by means hereinafter described, to impart an alternate longitudinal reciprocating motion to the racks to agitate and advance the straw thereon. On account of the longitudinal divergence of the racks the staw is directed thereby toward the sides of the housing 1 so that when discharged therefrom upon the second or intermediate set of the primary racks it is distributed with comparative uniformity across the entire width of said racks instead of being bunched in the center of the racks as it would be if carried directly rearward from the threshing cylinder of which the length is considerably less than the width of the housing. Straw is prevented from dropping through the V-shaped space left between the central pair of the racks 9 by means of the overlapping triangular shields 18 secured to said racks as shown in Fig. 3.

The second or intermediate set 19 and the third or rearward set 20 of the primary or upper racks, each extends rearwardly and upwardly from below the rearward end of the preceding set of racks. Each of said sets of racks, 19 and 20, consists of a plurality of sections arranged side by side and extending parallel with the sides of the housing 1. The said racks are supported by arms 12 carried on the transversely extending shafts 21, 22, 23, 24, 25, 26, 27 and 28, the alternate sections of the set 19 being connected with the shafts 21 and 23, the other sections of said set 19 being connected with the shafts 22 and 24, the alternate sections of the set 20 being connected with the shafts 25 and 27, and the other sections of said set 20 being connected with the shafts 26 and 28. All of said shafts are journaled in suitable bearings in the sides of the housing 1, and the shafts 23, 24, 25 and 26 extend through the same and are connected with driving mechanism, as hereinafter described, for imparting to the racks alternate longitudinal reciprocating movements to agitate and advance the straw thereon.

The secondary straw racks 29 and 30 are arranged below the primary racks 11, 19 and 20 in the relative positions shown in Fig. 1. The said racks 29 and 30 each consist of a single rack section extending the entire width of the housing instead of being divided into a plurality of sections as are the primary upper racks. The said secondary racks are supported by arms 31 which are pivotally mounted on the sides of the housing and extend upward to connect with the racks. The said arms 31 at the adjacent ends of the racks have short shafts 32 and 33 passing through the sides of the housing and connecting with driving mechanism as hereinafter described. Below the rearward secondary straw rack 30 is disposed the tertiary straw rack 34 consisting of a single section extending the entire width of the housing and being supported in the same manner as the secondary racks 29 and 30, by arms 31 pivoted on the sides of the housing.

Below the rearward end of the rack 30 a pan 35 is secured thereto, said pan receiving the materials passing through the rack, carrying the same forward to about the center of the tertiary rack 34, and discharging onto said rack. A similar pan 36 is carried below the rack 34, said pan receiving materials passing through said rack, carrying the same to about the center of the chaffer 37, and discharging thereonto. The auxiliary cleaning fan 38 is located in front of the tertiary straw rack 34 and is arranged to direct a blast of air over the pans 35 and 36, and through and over the rack 34 and the rearward ends of the racks 30 and 20, as indicated by the arrows in Fig. 1. The said fan 38 is carried on the transversely extending shaft 39 and is inclosed by a suitable casing 40, as shown.

Extending from the front end of the housing 1, below the cylinder and concaves, to a point above the front end of the chaffer 37, is the sheet-metal distributing conveyer table 41 on which is received the grain and chaff falling from the concaves and passing through the forward straw racks. At each side of the said table are endless sprocket chains 42 passing over sprockets 43 on the shafts 44, 45 and 46. Transversely extending slats 47 are secured to said chains and actuated thereby, passing rearwardly over the table 41 and returning below said table over the lower table 48. Along the sides of the housing above the table 41 are secured canvas flaps 49 which extend inwardly over the chains 42 and sprockets 43 preventing grain, etc. from falling into the same. Above the transverse slats 47 are longitudinally extending divergent slats 50, the same being held in position by wires 51 extending to the sides of the housing, as shown in Figs. 4 and 7. The said wires 51 are sufficiently slack to permit the longitudinal slats to rest their weight on top of the transverse slats. On account of the divergent positions of the said longitudinal slats any grain piled above the transverse slats will be directed toward the sides of the housing so that before leaving the conveyer and being discharged upon the chaffer the grain will be uniformly distributed across the entire width thereof. In the rear of the conveyer table is arranged a check board 52 having a hinged lower portion to which is secured a depending canvas flap 53. Said check board and flap serve to prevent grain discharged from the conveyer table from being thrown too far rearward on the chaffer.

Below the front end of the chaffer is the usual cleaning fan 54 carried by the shaft 55 and inclosed in a suitable casing 56. A grain pan 57 is carried below the front end of the chaffer, the same being adapted to receive the grain passing through the chaffer and carry the same rearward over the fan casing 56, discharging onto the sieve 58. The discharge opening of the fan casing 56 is arranged to direct the air blast therefrom over the inclined table 59 and through the sieve 58 and the rearward portion of the chaffer. At the lower and upper ends, respectively, of the inclined table 59 are the usual grain and tailings augers 60 and 61. The rearward ends of the chaffer 37 and the sieve 58 are supported by the rocker arms 82 pivoted on the sides of the housing 1, the upper ends of the arms being connected to the chaffer and the lower ends to the sieve. The front ends of the chaffer and sieve are supported by the arms 83 and 84, said arms being pivoted, respectively, on the sides of the housing below the chaffer and above the sieve, and being of a length corresponding to that of the upper and lower portions of the rocker arms 82, as shown in Fig. 1.

From the upper to the lower of the straw racks the size of the openings between the slats thereof is gradually decreased so that the materials which pass through the same become of smaller and smaller size. The intermediate and rearward primary racks 19 and 20, and the secondary racks 29 and 30 are made adjustable as to the extent of opening between the slats thereof, the means of adjustment being as shown in detail in Figs. 5 and 6. Each of the slats 62 is pivotally connected with the side pieces of the rectangular frame 63 and all of the slats of each rack are connected together by longitudinally extending rods 64 which rest in suitable notches in the upper edges of the slats and are pivotally connected with each of the same. At the lower edges of the slats are secured flat springs 65 which extend downwardly therefrom and are connected with a longitudinally extending rod 66, as shown. On one end of the rearward slat of each rack is secured a flat spring 67 having on the outer end thereof a hand knob 68 and a pin 71 adapted to enter any one of a number of holes in a head 69 carried on the frame 63. A rod 70 connects the spring 67 with the rod 66 and a tension is maintained thereby on all of the flat springs 65 which thereby prevent the slats from becoming loose and rattling. The angular position of the slats may be adjusted by grasping the knob 68, pulling the spring 67 laterally as indicated by dotted lines in Fig. 6, to disengage the pin 71 from the hole in the head 69, and then turning the slats to the desired angle and engaging the pin 71 with the hole in the head 69 corresponding nearest to the desired adjusted position, the tension of the spring 67 holding the pin in engagement with the head. Two adjusted positions of the slats and longitudinal connecting rods are shown by the full and dotted lines in Fig. 5, and a third position of the slats only is shown by dotted lines in the same figure.

Outside the housing 1 on each side of the machine are driving belts 72, each of which passes over a pulley 73 on the cylinder shaft 3, thence around a pulley 74 on the shaft 55 of the cleaning fan, thence over a pulley 75 on the shaft 45, thence over a pulley 76 on the shaft 39 of the auxiliary cleaning fan, thence over a pulley 77 on the lower transverse eccentric-shaft 78, thence over a pulley 79 on the upper transverse eccentric-shaft 80, thence over a pulley 81 on the shaft 6, and thence back to the pulley 73 on the cylinder shaft, as shown in Fig. 2. As the driving mechanism is in duplicate, being the same on each side of the machine, for convenience in the following description reference will be made to the mechanism on only one side of the machine, that shown in Fig. 2. On the shaft 45 is an eccentric 85 from which a rod 86 extends rearwardly and is connected with the upper end of the rocker arm 82 through an opening in the side of the housing 1. The chaffer 37 and sieve 58 are thus given a longitudinal reciprocating motion and as the said parts move in opposite directions they counterbalance each other and do not cause undue vibration of the machine body. On the shaft 78 is an eccentric 87 from which a rod 88 extends rearwardly and is connected with the side of the tertiary straw rack 34 through a suitable opening 89 in the side of the housing 1. A spring 90 is connected to the rod 88 and the housing, as shown, the same serving to counterbalance the rack. A second eccentric 91 on the shaft 78 has a rod 92 connecting the same with the lower end of the rocker arm 93 on the outer end of the short shaft 33. From the upper end of the rocker arm 93 a rod 94 extends diagonally forward and downward to connect with an arm 95 depending from the outer end of the short shaft 32. The shafts 32 and 33 are thus alternately rotated in opposite directions and, through the arms 31 on the inner ends thereof, actuate the secondary straw racks 29 and 30 in opposite directions so that said racks counterbalance each other. On the shaft 80 is an eccentric 96 from which a rod 97 extends rearwardly and is connected with an arm 98 extending upwardly from the shaft 26. From the same arm a rod 99 extends rearwardly and connects with the lower end of the swinging arm 100 which is pivoted on the side of the housing 1. From said swinging arm 100 a second rod 101 extends forwardly and connects with the arm 102 depending from the shaft 25. The shafts 25 and 26 are thus alternately rotated in opposite directions and, through the arms 12 carried thereby inside the housing, actuate in opposite directions the alternate sections of the set 20 of the primary straw racks, said alternate racks thus counterbalancing each other.

On the shaft 80 is a second eccentric 103 from which a rod 104 extends forwardly and passes through a guide 105 secured on the side of the housing. On the rod 104 is a cross bar 106 from the upper end of which a rod 107 extends rearward and connects with an arm 108 extending upwardly from the shaft 24. From the lower end of the cross bar 106 a rod 109 extends rearwardly and connects with an arm 110 depending from the shaft 23. The end of the eccentric rod 104 in front of the guide 105 is connected by a ball and socket joint 111 with a rod 112 which extends forwardly therefrom and is connected with the upper end of a rocker arm 113 carried on the outer end of the shaft 15ª. From the lower end of said rocker arm 113 a rod 114 extends forwardly and is connected with the lower end of the swinging arm 115 pivoted on the side of the housing 1. From said swinging arm a second rod 116 extends rearwardly and is connected with the arm 117 extending upwardly from the shaft 13ª. The ball and socket joint 111 in the eccentric rod accommodates the side play of the rocker arm 113 resulting from the angular position of the shaft 15ª carrying the same. The arms 115 and 117 and rods 114 and 116 are all supported in slightly inclined positions, as shown in Fig. 2, so that their planes of movement are parallel with that of the rocker arm 113. In Fig. 2 one extreme of movement of the various rods and arms of the driving mechanism is shown in full lines, the other extreme of movement thereof being shown in dotted lines. Also in said Fig. 2 are shown in dotted lines the positions of the straw racks, and the arms 12 and 31 supporting the same, in the positions thereof corresponding to the positions of the driving rods and arms shown in full lines in said Figure. By reference to the foregoing it will be apparent that in each set of the primary straw racks 11, 19 and 20, the alternate sections, being connected to the same driving mechanism and moving in opposite directions, counterbalance each other, thus preventing undue vibration and shaking of the machine body, equalizing the strains on the driving mechanism and reducing the power necessary to drive the machine.

From the foregoing the operation of the machine as a whole will be obvious to those skilled in the art and need not be further explained here. Attention is directed, however, to the arrangement of the arms supporting the shaking racks in the machine, said arms being pivoted below the racks and the arc of movement thereof being such that at the extreme forward position thereof the arms are slightly above a horizontal position, and at the extreme rearward position thereof the arms are nearly vertical. Each end of the racks being similarly supported it follows that all points in the racks reciprocate in arcuate paths the same as those described by the upper ends of the supporting arms, with the result that the straw upon the racks is tossed upward and rearward thereby at each reciprocation thereof. The straw is thus carried rapidly over the racks in a thin continuous stream, being continuously jostled and shaken.

Now, having described my invention, what I claim and desire to secure by Letters Patent is:—

1. In a separator mechanism, adjustable straw racks each comprising a frame, transversely extending slats pivotally held therein, longitudinally extending rods connecting all of said slats, springs secured to each of the slats, a rod connecting said springs with means for maintaining a tension thereon, and means for adjusting the angular position of the slats without varying the tension upon said springs.

2. In a separator, the combination with a threshing cylinder of a plurality of divergent straw racks mounted side by side upon actuating multiple crank shafts adapted to receive straw from said cylinder and distribute the same over a space wider than the length of the cylinder, and actuating means for imparting to each of said racks a longitudinal reciprocating motion.

3. In a separator, a housing, a threshing cylinder arranged near one end thereof, a plurality of longitudinally reciprocating straw-racks adapted to receive straw from the cylinder and carry the same rearwardly, the said straw racks being arranged in sets of which the one nearest the cylinder consists of divergent sections mounted side by side upon actuating multiple crank shafts and the other sections consisting of parallel sections, and means for actuating said racks whereby the alternate sections of each set will be moved in directions opposite to the other sections of the set.

4. In a separator, the combination with a threshing cylinder, shaking racks and cleaning devices, of a table arranged to receive materials passing through the racks, transversely extending slats movable longitudinally of the table to convey materials received thereon to the cleaning devices, and divergent longitudinally extending slats arranged above the transverse slats to direct materials piled above the transverse slats toward the sides of the table.

5. In a separator, the combination with a threshing cylinder, of a plurality of reciprocating straw racks adapted to receive straw from the cylinder and carry the same rearwardly, said racks being arranged in sets, of which the set nearest the cylinder consists of divergent sections mounted upon actuating multiple crank shafts adapted to spread the straw toward the sides of the separator, and the other sets being arranged in separate parallel sections, means for actuating the racks whereby the alternate sections of each set will be moved in directions opposite to the other sections of the set, a chaffer, a distributing conveyer table having one end arranged over the chaffer for coöperation with the latter, a sieve beneath the chaffer, a fan arranged adjacent the sieve, and an auxiliary fan above the first mentioned fan, for the purpose specified.

6. In a separator, the combination with a threshing cylinder, of a plurality of reciprocating straw racks adapted to receive straw from the cylinder and carry the same rearwardly, said racks being arranged in separate sets, the set nearest the cylinder consisting of diverging sections, other sets in the rear of the diverging sets consisting of parallel sections, a forward and a rearward section, each arranged across the machine beneath the aforesaid racks, another rack arranged in the rear of the machine beneath the aforesaid rearward rack, a chaffer, a sieve beneath the chaffer, a fan arranged beneath the chaffer and disposed at one end of said sieve, a distributing conveyer table arranged beneath said diverging racks and the aforesaid forward rack and having one end disposed over the forward end of the chaffer, the said rearward rack and the rack immediately beneath the latter rack carrying pans, and an auxiliary fan arranged above the chaffer for disposition at the end of the last mentioned rack to direct a blast of air over said pans and through all of the racks in the rear of the machine, substantially as described.

7. In a separator, the combination with a threshing cylinder, of sets of racks arranged in the machine to spread the straw over an area greater than the length of the cylinder, the rack sections adjacent the cylinders being arranged in divergent pairs.

8. In a grain separator, the combination with a treshing cylinder and grain cleaning devices, of separate sets of reciprocating straw racks, one set of racks comprising pairs of divergent straw racks adapted to receive straw from said cylinder and distribute the same over a space wider than the length of the cylinder, and means for operating the racks.

9. In a separator, the combination with a threshing cylinder, of sets of racks arranged in pairs at each side of the central axis of the machine, the racks of each pair lying parallel with each other and diverging from said axis of the machine toward the sides of the latter.

10. In a separator, the combination with a threshing cylinder; of pairs of divergent straw racks adapted to receive straw from said cylinder and distribute the same over a space wider than the length of the cylinder; and means for shaking the racks.

11. In a separator, the combination with a threshing cylinder; of pairs of divergent straw racks adapted to receive straw from said cylinder and distribute the same over a space wider than the length of the cylinder; means for shaking the racks; and a shield disposed between the innermost racks of each pair to prevent material dropping between said innermost racks.

12. In a separator, the combination with a threshing cylinder; of pairs of divergent straw racks adapted to receive straw from said cylinder and distribute the same over a space wider than the length of the cylinder; means for shaking the racks; and substantially triangular shaped overlapping shields disposed between the innermost rack of each pair to prevent material dropping between the innermost racks.

13. In a separator mechanism, adjustable straw racks each comprising a frame, slats pivotally held within the frame, a rod connecting all of the slats, a spring secured to each slat, a rod connecting said springs, and means for adjusting the angular position of the slats without varying the resistance upon said springs.

14. In a separator, the combination with a threshing cylinder, shaking racks and cleaning devices; of a table arranged to receive materials passing through the racks; transversely extending slats movable longitudinally of the table to convey materials received thereon to the cleaning devices; and separate sets of series of divergent, longitudinally extending slats arranged over the transverse slats to direct materials piled above the slats toward the sides of the table.

15. In a separator, the combination with a threshing cylinder, shaking racks and cleaning devices; of a table arranged to receive materials passing through the racks; transversely extending slats movable longitudinally of the table to convey materials received thereon to the cleaning devices; and separate sets of yieldable, divergent, longitudinally extending slats arranged above the transverse slats to direct materials piled above the slats toward the sides of the tables.

16. In a separator, the combination with a cylinder, shaking racks and cleaning devices; of upper and lower tables, the upper table arranged to receive materials passing through the rack; transversely extending slats movable rearwardly over the upper table and returning over the lower table; and divergently extending slats arranged above the transverse slats to direct materials piled above the slats toward the sides of the upper table.

In testimony whereof I have hereunto subscribed my name in the presence of witnesses.

WILLIAM KOESTER.

Witnesses:
   D. E. FOLEY,
   F. W. WOODS,
   H. C. BATTY.